(12) United States Patent
Nozaki et al.

(10) Patent No.: US 6,889,472 B2
(45) Date of Patent: May 10, 2005

(54) AUTOMOTIVE WEATHER STRIP

(75) Inventors: Masahiro Nozaki, Aichi (JP); Shuji Nakano, Aichi (JP); Masaki Ohashi, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/242,699

(22) Filed: Sep. 13, 2002

(65) Prior Publication Data
US 2003/0051411 A1 Mar. 20, 2003

(30) Foreign Application Priority Data

| Sep. 14, 2001 | (JP) | ..................................... P2001-279033 |
| Nov. 6, 2001 | (JP) | ..................................... P2001-340563 |
| Dec. 11, 2001 | (JP) | ..................................... P2001-377570 |

(51) Int. Cl.[7] .............................. E06B 7/22; E06B 7/16
(52) U.S. Cl. ..................................... 49/498.1; 49/475.1
(58) Field of Search ................................ 49/479.1, 506, 49/498.1, 475.1, 440, 441, 480.1; 296/146.9, 76, 207

(56) References Cited

U.S. PATENT DOCUMENTS

| 5,067,280 A | 11/1991 | Arima |
| 5,183,522 A | 2/1993 | Arima |
| 5,376,319 A | 12/1994 | Arima |
| 5,806,247 A | * 9/1998 | Yamamoto .................. 49/495.1 |
| 6,250,018 B1 | 6/2001 | Kawai et al. |
| 6,385,839 B2 | 5/2002 | Kawai et al. |
| 6,395,355 B1 | 5/2002 | Nakajima et al. |
| 6,487,820 B1 | * 12/2002 | Nakajima et al. .......... 49/490.1 |
| 2001/0027622 A1 | 10/2001 | Mine et al. |

FOREIGN PATENT DOCUMENTS

| EP | 0279100 | 8/1987 |
| EP | 1132242 | 9/2001 |
| JP | 03164327 | 7/1991 |

* cited by examiner

Primary Examiner—Hugh B. Thompson, II
(74) Attorney, Agent, or Firm—Posz Law Group, PLC

(57) ABSTRACT

The present invention relates to a weather strip attached to a flange (2) of a door opening part (1) of a vehicle body and that has a mounting base part (51) and a hollow seal part (52) in which tip ends of side-face projections (521,522) protruding from one side face of the mounting base part (51) so as to increase the width of the hollow seal part (52) toward the tip ends thereof are connected to each other by a seal wall (523). The projecting widths of the side-face projections (521,522) are changed in each of a first part (5A), a second part (5B), and a third part (5C), each of which is provided along a corresponding one of a roofside portion (1A), a front vertical portion (1B), and a rear vertical portion (1C) of the door opening (1). This changes the tilt angle of the seal wall 523 with respect to the flange (2).

11 Claims, 11 Drawing Sheets

DOOR CLOSING DIRECTION

US 6,889,472 B2

AUTOMOTIVE WEATHER STRIP

The present application is based on Japanese Patent Application Nos. 2001-279033, 2001-340563 and 2001-377570, the entire contents of which are incorporated herein by reference.

BACKGROUND OF THE INVENTION

1. Field of the Invention

The present invention relates to a sealing structure between a body and a door of the vehicle. More specifically, the invention relates to weather strips mounted along an opening part of the door opening or along a peripheral part of the door.

2. Description of the Related Art

As illustrated in FIG. 10, along a door opening peripheral part 1 of vehicle body, an opening trim weather strip is continuously provided so as to seal between the door opening peripheral part 1 and an outer peripheral part of a door 3.

As illustrated in FIG. 11A, the opening trim weather strip 5 has a mounting base part 51 and a hollow seal part 52 projecting from one side face of the mounting base part 51. The mounting base part 51 is attached to a flange 2 formed on the door opening peripheral part 1.

The hollow seal part 52 has a structure in which tip ends of side-face projections 521 and 522 protruding from the one side face of the mounting base part 51 in such a way as to increase the distance therebetween toward the tip ends thereof are connected to each other by a seal wall 523. The weather strip 5 is an extrusion of a rubber-like elastic material, such as rubber and a thermoplastic elastomer. The mounting base part 51 is made of a solid material. The seal wall 523 is made of a sponge material. Both the side-face projections 521 and 522 may be made of a solid material substantially over the full width thereof. Alternatively, the side-face projections 521 and 522 may be configured so that only the bottom parts connected to the mounting base parts 51 are made of a solid material, while the rest of each of the side-face projections 521 and 522 is made of the sponge material, which is the same as that employed as the material of the seal wall 523.

The flange 2 projects from the door opening peripheral part 1 in a direction along the vehicle body side face provided around the opening part 1. Further, as shown in FIGS. 10 and 11A, the flange 2 projects downwardly, obliquely and outwardly at a roofside portion 1A of an upper part of the door opening peripheral part 1. Furthermore, the flange 2 projects rearwardly and frontwardly at front and rear vertical portions 1B and 1C of the opening part 1, respectively. Moreover, the flange 2 projects perpendicularly and upwardly at a rocker portion 1D of the bottom part of the opening part 1. Further, the mounting base part 51, which has a substantially U-shaped section, of the weather strip 5 covers and is fitted onto this flange 2. Incidentally reference numeral 4 in FIG. 11B denotes a door glass.

Because of the fact that the projecting direction, in which the flange 2 projects from the door opening peripheral part 1, varies with the parts thereof, a direction, in which the outer peripheral part of the door 3 is pressed against the seal wall 523 of the weather strip 5 attached to the flange 2, varies with the parts of the opening part 1.

FIGS. 10, 12A, 12B, 12C, and 12D illustrate the approaching directions (pressing direction), in which the door 3 approaches to the flange 2, at the roofside portion 1A, the front vertical portion 1B, the rear vertical portion 1B, and the rocker portion 1D, respectively. At the roofside portion 1A, as indicated by an arrow $P_A$, the door 3 approaches from an oblique direction. At the front vertical portion 1B to which the door 3 is hinge-connected, as indicated by an arrow $P_B$, the door 3 approaches from a more oblique direction. At the rear vertical portion 1C, and the rocker portion 1D, as indicated by arrows arrow $P_C$, and $P_D$, the door 3 approaches from a direction that is substantially perpendicular to the flange 2 (namely approaching angles $\alpha_2 < \alpha_1 < \alpha_3$, $\alpha_4$). Usually, the difference between the approaching angles $\alpha_2$ and $\alpha_3$ is 50° or so.

Therefore, when a continuous weather strip extruded so as to have sections of the same shape is attached to the door opening peripheral part 1, the direction in which the door is pressed against the seal wall varies greatly with the parts of the opening part 1. Accordingly, the seal performance of the weather strip 5 varies greatly therewith.

Further, a rising angle $\beta$ of an inner side-face projection 522 of weather strip 5 with respect to a side face 511, which is parallel to the flange 2, of the mounting base part 51 is set to be equal to or more than an approach angle $\alpha$ of the door 3, the side-face projection 522 serves as a strut for the door 3 that approaches there, so that a door closing force increases. Thus, it is unfavorable to set the rising angle $\beta$ in such a manner.

When the rising angle $\beta$ of the side-face projection 522 is set to be less than an approach angle $\alpha^2$ of the door 3 in the case that the weather strip 5 formed along the door opening peripheral part 1 by an extrusion method so as to have sections of the same shape, a direction, in which the side-face projection 522 extends, is too much apart from the approaching directions $P_A$ and $P_C$ of the door 3, which correspond to the roofside portion 1A of the door opening peripheral part 1 and to the rear vertical portion 1C thereof, respectively. When the seal wall 523 is inwardly pressed at the time of closing the door, as indicated by dashed lines in FIG. 11B, and an amount of displacement of the pressed seal wall 523 is large, an end portion of the seal wall 523 connected to the side-face projection 522 bulges out from a tip end of the side-face projection 522 toward the inside of a vehicle interior. This bulge portion 522' appears in a vehicle interior and thus disfigures the appearance of the vehicle interior and deteriorates the quality thereof.

On the other hand, door weather strips, which are illustrated in FIGS. 13 and 14A through 14C for example, are attached to a front door or a rear door of the vehicle for sealing between the door and the vehicle body.

As shown in FIG. 13, a door weather strip 70 (the figure illustrates a front door weather strip) has a plurality (three in this example) of extrusion parts 71, 72, and 73, each of which extends substantially linearly. Further, end faces of such extrusion parts 71 to 73 are connected by a plurality (in the case of this example, 3) of molding parts 74.

Furthermore, as illustrated in FIGS. 14A to 14C, the extrusion parts 71 to 73 commonly have this door weather strip 70 that has a mounting base portion 75, a hollow seal portion 76, and a backside seal 77 outwardly protruding from the seal portion 76. Although not shown in the figures, each of the molding parts 74 has a mounting base portion, a seal portion, and a backside seal, which respectively continue into the mounting base portion 75, the seal portion 76, and the backside seal 77 of the corresponding two of the extrusion parts 71 to 73. Incidentally reference numeral 78 in FIG. 14A denotes a sub-seal lip.

When the state of the door is changed from an opening state to a closed state, such the weather strip 70 elastically deforms in a state in which the seal portion 76 is in contact with an opening part 80 of the vehicle body. Thus, the inside and the outside of the vehicle are sealed through the weather strip 70 between the body and the door of the vehicle.

However in the conventional door weather strip, there is a fear that when the seal portion 76 and the opening part 80 are brought into contact with each other so as to close the door, the entire seal portion 76 elastically deforms by simultaneously inclining only in a limited direction with respect to a center line D as indicated by dashed lines in FIGS. 14A to 14C.

When the entire seal portion 76 deforms in this way, the resistance to a movement of closing the door becomes large. Further, when the entire seal portion 76 deforms by simultaneously inclining only in a limited direction as described above, sliding friction is caused in a contact part between the seal portion 76 and the opening part 80. Thus, there is a fear that the resistance to a movement of closing the door increases still more.

In such a case, a door closing force at the time of closing the door becomes large. Thus, the conventional door weather strip has a problem that the feeling of closing the door is deteriorated. Moreover, because of the fact that a pressure-contact state of bringing the seal portion 76 and the opening part 80 into contact with each other is a state in which the side wall portion of the hollow seal portion 76 is in planar-contact with the opening part 80, there is a fear that the sealing performance of the weather strip is degraded owing to fatigue thereof.

Such actual conditions are almost common to not only the case of the front door but also the case of the rear door.

The unevenness of that the sealing properties along the door is caused by a fact that orientation of the sealing walls is not properly adjusted so as to correspond to the shape of the mating member received by such the seal walls.

However, most of the conventional weather strips as described above are continuously formed by extrusion, having uniform sectional shapes in the longitudinal direction thereof.

The weather strip having different sectional shapes in the longitudinal direction would be possibly obtained by performing molding for corner portions so as to connect the separate extruded weather strips. However, such the molding process inevitably raises manufacturing costs.

SUMMARY OF THE INVENTION

The invention is accomplished to solve the problems of the conventional sealing structure between the door and the body of the vehicle. An object of the invention is to provide a sealing structure of the opening part in the vehicle, which is enabled to improve the feeling of closing the door as well as to improve the sealing performance thereof.

In particular, the invention is directed to provide a weather strip, which is continuously attached to the door opening peripheral part of the vehicle body, to bring out the uniform and good seal performance thereof by forming a seal wall, which is provided at each of a roofside portion and front and rear vertical portions of the door opening peripheral part, so as to extend in the direction perpendicular to the direction in which the door is pressed.

Also the invention is related to prevent the appearance of a bulge in the weather strip, which is continuously attached to the door opening peripheral part of the vehicle body, during the seal wall is pressed against the door, even in the case that the approaching directions of the door, which respectively correspond to the roofside portion of the door opening peripheral part, the front vertical portion, and the rear vertical portion thereof, differ from one another, and also enable uniform deformation of the seal wall at the time of closing the door to thereby enhance the sealing performance thereof and maintain good appearance of the vehicle interior. Further, another object of the invention is to enable the weather strip to prevent a shoe of a passenger from being caught on the seal wall that is the part thereof provided at a rocker portion of the bottom part of the door opening peripheral part.

To solve the above problems, the orientation of the sealing walls should be properly adjusted so as to correspond to the shape of the mating member received by such the seal walls. Accordingly it is desirable that the weather strip has varying sectional shapes in accordance with mount position on the vehicle body or the door in order to avoid unevenness in sealing properties.

Hereinafter, means for solving the problems and achieving the object are described by itemization thereof. Incidentally, operations and effects peculiar to such means are appended to the description thereof as needed.

(1) More specifically, there is provided a weather strip, which is attachable to a peripheral part of one member of a door and a door opening part in a vehicle body for sealing between the vehicle body and the door, the weather strip comprising:

a mounting base part which is attachable to the peripheral part of the one member of the door and the door opening part;

a hollow seal part bulging out from the mounting base part toward the other member of the door and the door opening part, the hollow seal part including an inner side-face projection and an outer side-face projection, which protrude from the mounting base part so as to increase a distance therebetween toward tip ends thereof, and a seal wall connecting the tip ends of the inner and outer side-face projections in a convex manner, wherein a protruding portion of the other member is pressed against the seal wall when the door is closed;

wherein projecting widths and projecting angles of the outer and inner side-face projections vary in a longitudinal direction of the weather strip so that the seal wall is disposed substantially perpendicular to a pressing direction of the other member.

In the above weather strip, the orientation of the sealing wall is adjusted so as to correspond to the shape of the mating member which is received by the seal wall.

(2) In the invention, there is provided a weather strip according to (1), wherein the weather strip is an opening trim weather strip attached to a flange formed on the peripheral part of the door opening part;

the weather strip includes a first part which is attached to a roofside portion of the peripheral part of the door opening part, a second part attached to a first vertical portion of the peripheral part to which the door is hinge-connected, and a third part attached to a second vertical portion of the peripheral part of the door opening part which is located on an opposite side to the first vertical portion with respect to the door opening part; and wherein a projecting width of the outer side-face projection in the second part is substantially equal to a projecting width of the outer side-face projection in the first part, a projecting width of the inner side-face projection in the second part is smaller than a projecting width of the inner side-face projection in the first part, a projecting width of the inner side-face projection of the third part is substantially equal to a projecting width of the inner side-face projection of the first part, and a projecting width of the outer side-face projection in the third part is smaller than a projecting width of the outer side-face projection in the first part;

whereby a tangential direction of the seal wall in each of the first, second and third parts is set to be substantially perpendicular to the pressing direction of the door in a state in which the weather strip is attached.

Thus, the seal wall in the first, second and third parts is set in a plane substantially perpendicular to a direction in which the door is pressed in a state in which the weather strip is attached therealong. Inclining degrees of the seal wall can be adjusted so that the seal wall extends in a direction perpendicular to a direction in which the door is pressed thereagainst.

(3) In the invention, there is provided a weather strip according to (2), wherein a sectional shape of the hollow seal part in a fourth part of the weather strip attached to a rocker portion in a lower portion of the door opening part is substantially the same as the sectional shape of the hollow seal part in the second part. Thus, the hollow seal part is prevented from catching a shoe of a passenger and from being trampled by the shoe.

(4) In the invention, there is provided a weather strip according to (2), wherein the weather strip is formed by extrusion, and boundary parts between the first part and the second part as well as between the first part and the third part are formed so as to have sectional shape gradually changed from the one to the other mating sectional shape.

A variable extrusion method, according to which a plurality of mouthpieces for forming the outer shapes of the hollow seal parts and a plurality of mouthpieces for forming inner shapes thereof are installed at the front side of an extruding machine by being slidably superposed thereby to slide these mouthpieces from one another and to change the shapes of the hollow parts of the weather strip to be extruded, is applied to the extrusion of a weather strip, whose hollow seal parts partly differ from one another in the shape of the section. The boundary parts are formed in the course of extrusion.

(5) There is provided a weather strip according to (1), wherein the weather strip is a door weather strip attached to the outer peripheral part of the door, and the protruding portion is provided along at least a part of the opening part; and wherein a connection part between the seal wall and the inner and outer side-face projections are configured so as not to be in contact with the opening part.

In the above weather strip, the side-face projections are not deformed very much. It is mainly the seal wall that is elastically deformed so as to follow the shape of the tip end of the protruding portion. Thus, it is difficult to deform the entire seal portion and to deform the seal portion by being inclined only in a limited direction. Moreover, it is hard to cause a slide friction force between the seal portion and the opening part. Consequently, the door closing force at the time of closing the door can be suppressed. Moreover, the feeling at that time can be improved. Additionally, because the seal wall is elastically deformed in such a manner as to follow the shape of the tip end of the protruding portion, the sealing performance of the weather strip can be prevented from being degraded owing to the wear-out thereof.

Preferably, at least a part of the weather strip is formed by extrusion. Further, a part of the weather strip, which corresponds to a corner portion of the door, may be formed by molding.

In this case, the size of a region of the extrusion portion, in which the thickness of the seal portion is liable to be relatively large, can be reduced. Consequently, the resistance to a movement of closing the door can be decreased, as a whole.

Further the shape of a section at an end of the extrusion part may be the same as or almost the same as the shape of a section at the other end of the extrusion part. Thus, the structure of a mold to be used at the time of forming the extrusion can be prevented from being complicated. Further, when the extrusion is performed, in the case that a portion corresponding to the right-side door and another portion corresponding to the left-side door are continuously formed, and that change in an amount of an extruded material occurs in the longitudinal direction (that is, in the case of performing a variable extrusion method), almost no change in the amount of the extruded material occurs at the boundary between the portions respectively corresponding to the right-side door and the left-hand door. Consequently, accurate extrusion can be relatively easily performed.

(6) In the invention, there is provided a weather strip according to (5), wherein a distance between the inner and outer side-face projections increases toward a seal wall side from an attachment base part side. In the weather strip, the section of the seal portion is shaped nearly like a sector. Thus, the deformation of the seal wall, whose part corresponding to the protruding portion bulges out in a curved manner so as to face the protruding portion, can be more reliably and preferentially performed. Consequently, the aforementioned operations and effects can be reliably obtained.

(7) In the invention, there is provided a weather strip according to (5), wherein the protruding portion has a first face and a second face intersecting with the first face, wherein one of the pair of side-face projections extends substantially parallel to the first face, and wherein the other of the pair of side-face projections extends substantially parallel to the second face. Thus, the side-face projections become more difficult to bend. Consequently, the deformation of the seal wall is more reliably and preferentially performed. Thus, the aforementioned operations and effects can be reliably obtained.

(8) In the invention, there is provided a weather strip according to (5), wherein a length of each of the side-face projections is larger than a thickness of the seal wall. This facilitates the preferential implementation of elastic deformation of the seal wall. Moreover, a sufficient amount of deformation of the seal wall can be assured. Thus, even when variation in the degree of projection of the protruding portion occurs, variation in the door closing force is hard to occur.

Specifically, it is preferable that an apex part of the protruding portion is placed nearly at the center of the seal wall during a closed state of the door. Thus, the deformation of the seal portion, which is inclined only in a limited direction, is difficult to occur. Consequently, reduction in the sealing performance of the weather strip can be more reliably prevented.

(9) In the invention, there is provided a weather strip according to (1), wherein the weather strip is an opening trim weather strip attached to a flange formed on the peripheral part of the door opening part;

the weather strip includes
a first part which is attached to a roofside portion of the peripheral part of the door opening part,
a second part attached to a first vertical portion of the peripheral part to which the door is hinge-connected, and
a third part attached to a second vertical portion of the peripheral part of the door opening part which is located on an opposite side to the first vertical portion; and
wherein rising angles of the inner side-face projection with respect to a side face of the mounting base portion are set to be $\beta_3 \geq \beta_1 > \beta_2$,
where $\beta_1$ is the rising angle in the first part, $\beta_2$ is the rising angle in the second part, and
$\beta_3$ is the rising angle in the third part.

(10) In the invention, there is provided a weather strip according to (9), wherein the inner and outer side-face projections are formed from a solid material or a minutely foamed material, which is higher in stiffness than a sponge material forming the seal wall.

(11) In the invention, there is provided a weather strip according to (9), wherein at least one of the inner and outer side-face projections is formed so as to bent into an L-shape.

(12) In the invention, there is provided a weather strip according to (9), wherein the rising angles of the inner side-face projection of the hollow seal part are set so that $20° \leq \beta_1 \leq 30°$, $0 \leq \beta_2 \leq -15°$, and $30° \leq \beta_1 \leq 45°$ where it is assumed that an angle corresponding to a direction parallel to the side face of the mounting base part is set to be 0°, that angles corresponding to a direction toward an external side of a vehicle are positive angles, and that angles corresponding to a direction toward an inner side of the vehicle are negative angles.

(13) In the invention, there is provided a weather strip according to (9), wherein the weather strip is formed by extrusion, wherein each of boundary parts among the first, second and third parts is formed so as to have sectional shape to be gradually changed from the one to the other mating sectional shape.

(14) Among the side-face projections, the stiffness of the side-face projection extending in a direction approximately coinciding with a direction, in which the door is closed, may be set to be higher than the stiffness of each of the remaining side-face projections. In this case, even when there is a difference in stress applied from the seal wall to the side-face projections therebetween when the door is closed, occurrences of defects due to excessive deformation of the side-face projections can be restrained, because the stiffness of the side-face projection, to which a higher stress is applied, is increased so as to be higher than the stiffness of the other side-face projections.

(15) Among the side-face projections, the stiffness of the side-face projection extending in a direction approximately coinciding with a direction, in which the door is closed, may be set to be higher than the stiffness of the seal wall provided in the vicinity of the remaining side-face projections. Thus, even when there is a difference in stress applied to the seal wall and the side-face projections therebetween in the direction of width of the seal wall when the door is closed, occurrences of defects due to excessive deformation of the side-face projections can be restrained, because the stiffness of the side-face projection, to which a higher stress is applied, is increased so as to be higher than the stiffness of the seal wall portion provided in the vicinity of each of the other side-face projections.

(16) The above protruding portion is integrally formed from a panel of the vehicle body. Therefore, the necessity for attaching a protruding portion to the opening part separately from the panel is eliminated. Moreover, increase in the number of operations and in the cost can be suppressed.

(17) The protruding portion may be provided along each of all or almost all of edge portions of the opening part. Thus, the closing force at the time of closing the door can be uniformed. The feeling at that time can be improved still more.

BRIEF DESCRIPTION OF THE DRAWINGS

FIG. 11B is a sectional view illustrating an attached state of a conventional weather strip attached along line A—A of FIG. 10;

DETAILED DESCRIPTION OF THE PREFERRED EMBODIMENTS

Figure 1A:
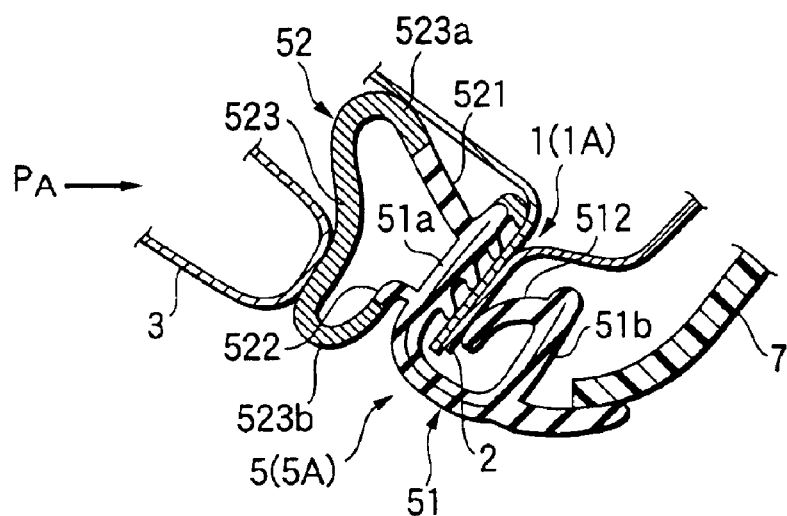
FIGS. 1A, 1B, and 1C are sectional views showing a weather strip according to the invention, which are respectively taken along lines A—A, B—B, and C—C of FIG. 10.
Figure 1B:
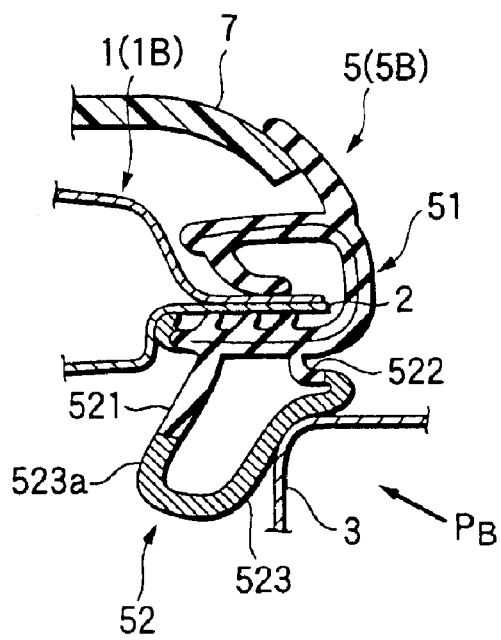
Figure 1C:
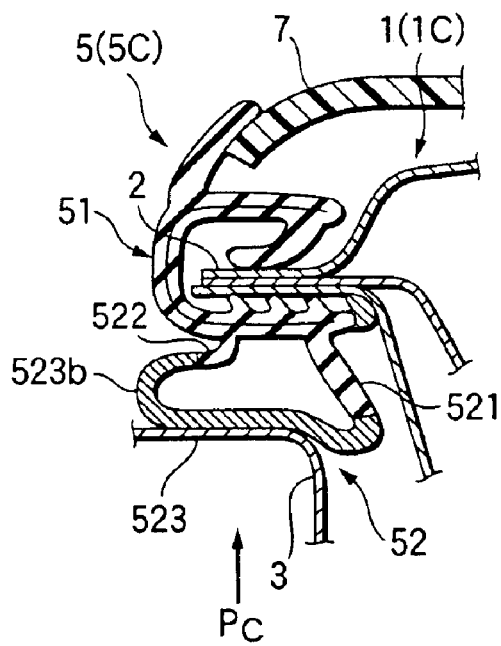

FIGS. 1A, 1B, and 1C respectively illustrate the sections of a part (that is, a first part 5A) provided along a roofside portion, a part (that is, a second part 5B) provided along a front vertical portion, and a part (that is, a third part 5C) provided along a rear vertical portion, which are in an attached state, of a weather strip 5 attached along a door opening peripheral part.

The weather strip 5 is EPDM rubber extrusion, and has mounting base parts 51, each of which has side walls 51a and 51b and also has a holding lip 512 projected from inner opposed faces, and hollow seal parts 52, each of which bulges out from a side face of a corresponding one of the mounting base parts 51. Each of the hollow seal parts 52 is shaped so that the tip ends of side-face projections 521 and 522 protruding from a side face of the mounting base part 51 in such a way as to increase the distance therebetween toward the tip ends are connected to each other like a circular-arc by a seal wall 523. The mounting base part 51 and the side-face projections 521 and 522 are made of a solid material. The seal wall 523 is made of a sponge material. The side-face projection 521, which is placed at the outer side of a door opening during a state in which the weather strip is attached thereto, that is, at the outer side of the hollow seal part 52, projects linearly from the side wall 51a in a somewhat outward direction rather than a direction perpendicular thereto. The inner side-face projection 522 is shaped so that a tip end thereof protrudes toward the inner side of the door opening by being bent like a letter "L". The shapes of the mounting base part 51, which is made of the solid material, and the side-face projections 521 and 522 of the hollow seal part 52, which are made of the solid material, are common to the parts provided over the full-length of the weather strip 5.

As shown in FIG. 1A, in the first part 5A of the weather strip 5, which is provided along the roofside portion 1A of the door opening peripheral part 1, an end of the seal wall 523 surrounding a side face of the mounting base part 51 like a circular-arc is connected to the side-face projection 521 through a side face extension portion 523a that extends the side-face projection 521. The other end of the seal wall 523 is connected to the side-face projection 522 through a side face extension portion 523b that extends a bent end part of the side-face projection 522. Further, the projecting width of the side-face projection 521 including the side-face extension portion 523a, and that of the side-face projection 522 including the side-face extension portion 523b are adjusted so that a general part of the seal wall 523 extends substantially vertically in the state in which the first part 5A is attached to the flange 2. Here, the projecting width means a length of the side-face projections 521, 522 projecting from the side wall 51a of the mounting base part 51 in a direction perpendicular to the wall face of the side wall 51a. Consequently, as indicated by an arrow $P_A$, when the door is closed, the outer peripheral part of the door 3 is pressed in a direction approximately perpendicular to the wall face of the general part of the seal wall 523 (that is, in a substantially perpendicular direction to the face thereof). Incidentally, reference numeral 7 designates an interior garnish of a vehicle chamber in this figure.

At the second part 5B of the weather strip 5, which is provided along the front vertical portion (first vertical portion) 1B of the door opening peripheral part 1 to which the door 3 is hinge-connected, as illustrated in FIG. 1B, the seal wall 523 has an end connected to an end of the side-face projection 521 through the side face extension portion 523a, which is used in common with the first part 5A, and also has the other end connected directly to the side-face projection 522. Thus, during a state in which the second part 5B is attached to the flange 2, the general part of the seal wall 523 serves as a slope facing an outwardly obliquely rear part of the vehicle body. As indicated by an arrow $P_B$, when the door is closed, the outer peripheral part of the door 3 is pressed in a substantially perpendicular direction to the surface of the general part of the seal wall 523.

As illustrated in FIG. 1C, at the third part 5C of the weather strip 5, which is provided along a rear vertical portion (second vertical portion) 1C of the door opening peripheral part 1, the seal wall 523 of the hollow seal part 52 has an end connected directly to an end of the side-face projection 521, and also has the other end connected to the side-face projection 522 through the side-face extension portion 523b, which is used in common with the first part 5A, conversely with the case of the second part B. Thus, during the a state in which the third part 5C is attached to the flange 2, the general part of the seal wall 523 is a face extending almost along the flange 2 and the side wall of the mounting base part 51 as a whole. As indicated by an arrow $P_C$, when the door is closed, the outer peripheral part of the door 3 is pressed in a substantially perpendicular direction to the surface of the general part of the seal wall 523.

Thus, at the roofside 1A, and the front and rear vertical portions 1B and 1C, when the door is closed, the outer peripheral part of the door 3 presses in the substantially perpendicular direction to the surface of the general part of the seal wall 523. Consequently, good sealing performance is effectively obtained over the full length of the weather strip.

Figure 2:
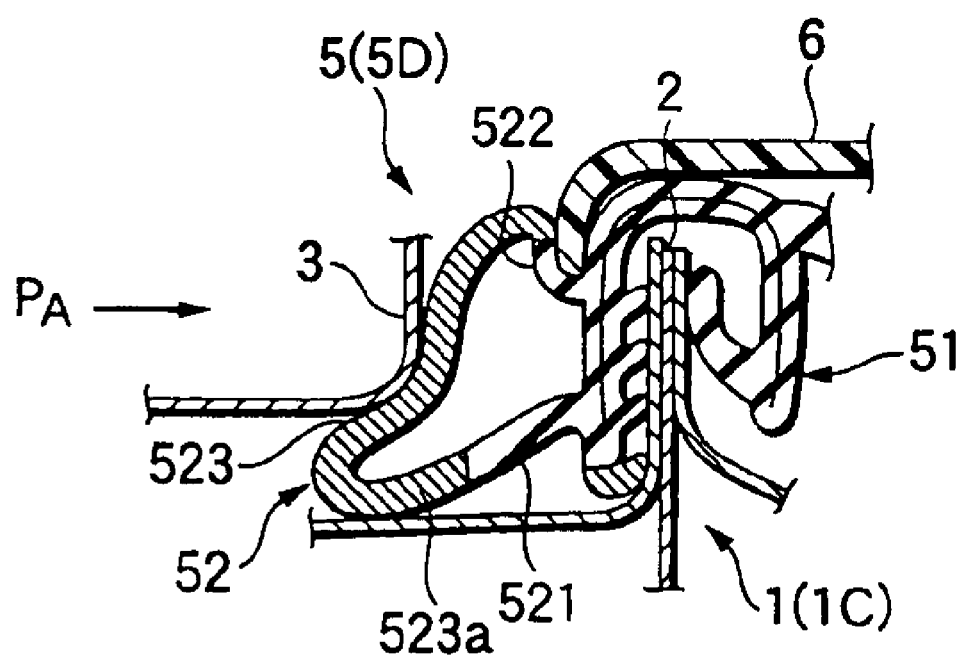
FIG. 2 is a sectional view showing the weather strip according to the invention, which is taken along line D—D of FIG. 10.

FIG. 2 illustrates a section of a fourth part 5D of the weather strip 5 that is in a state in which the fourth part 5D is attached along the rocker portion 1D of the door opening peripheral part 1. The hollow seal part 52 of the fourth portion 5D has a shape in common with the second part 5B. Thus, the top position of the hollow seal part 52, to which the side-face projection 522 and the seal wall 523 are connected, is lowered during a state in which the rocker portion 1D is attached to the flange 2. Consequently, the hollow seal part 52 is prevented from being caught and rubbed by the shoe of a passenger of the vehicle when the passenger gets on and out. In this figure, reference numeral 6 denotes a scuff plate for covering the rocker portion 1D.

When the door is closed, the seal wall 523 is pressed by the outer peripheral part of the door 3 from a slightly oblique direction, as indicated by an arrow $P_D$. Thus, the rocker portion is slightly inferior in the sealing efficiency to the other parts. However, demands on the sealing performance for the rocker portion 1D are not strict. Therefore, the rocker portion 1D has sufficient sealing performance from a practical standpoint. Incidentally, when the fourth portion 5D is formed so as to have a common sectional shape with a section of the third part 5C, the sealing efficiency is good because the door 3 is pressed in a perpendicular direction to the seal wall 523. However, the seal wall 523 is liable to be caught by a shoe of a passenger.

The weather strip can be manufactured by performing the aforementioned variable extrusion method. In this case, in a sequence of steps of the extrusion process, each of the seal walls provided at the boundary part from the first part 5A to the second part 5B, the boundary part from the first part 5A to the third part 5C through the second and fourth parts 5B and 5D, and the boundary part from the third part 5C to the first part 5A is formed so as to have a sectional shape to be gradually changed from a sectional shape of a corresponding one of the first part 5A and the third part 5C at one of both sides thereof to a sectional shape of a corresponding one of the second part 5B, the third part 5C, and the first part 5A at the other side thereof.

The weather strip is attached along the door opening peripheral part by cutting the sequential weather strip, which is formed by the extrusion, at a middle part of, for instance, the second part 5B or the third part 5C, and then connecting both ends of the weather strip, which is cut to a predetermined length, at the cutting part thereof in such a manner as to form a loop, and subsequently, the loop-like weather strip to the flange provided along the door opening peripheral part.

Incidentally, although the side-face projection 522 of the hollow seal part 52 is shaped like a letter "L" in the aforementioned embodiment, the side-face projection 522 may be formed into a linear shape. Further, the aforementioned structure of the weather strip 5 can be applied not only to the front door opening of the vehicle body but also to the rear door opening thereof.

A modification of the invention will be described along with FIGS. 3A, 3B, and 3C. Here, the modification is described with the same reference numerals as the foregoing embodiment for the corresponding members and components.

Similar to the forgoing embodiment, a weather strip 105 is an EPDM rubber extrusion, and comprises mounting base parts 51, each of which has side walls 51a and 51b formed in such a manner as to be parallel to each other, and which also has a holding lip 512 projected from inner opposed faces, and also comprises hollow seal parts 52, each of which bulges out from an external side face of a corresponding one of the mounting base parts 51. Each of the hollow seal parts 52 is shaped so that the tip ends of side face portions 521 and 522 protruding from a side face 511 of the mounting base part 51 so as to increase the width of the hollow seal part 52 toward the tip ends thereof are connected like a circular-arc each other by a seal wall 523. The seal wall 523 is made of a sponge material. The mounting base parts 51 and the side-face projections 521 and 522 constituting the side-face portions of the hollow seal part 52 are made of a solid material or a minutely foamed material (whose expansion ratio ranges from 10% to 25%), which is higher in stiffness than the sponge material. During a state in which the weather strip is attached along the door opening peripheral part, the side-face projection 521, which is placed at the outer-periphery side of a door opening, that is, at the outer-periphery side of the hollow seal part 52, projects linearly from the side face of the mounting base part 51 in a somewhat outward direction rather than a direction perpendicular thereto. The inner side-face projection 522 is shaped so as to have a substantially-L-shaped section so that a tip end portion of the mounting base part 51 protruding from the side face 511 substantially at right angles bends and that a bridge portion 522b extends out therefrom.

Figure 3A:
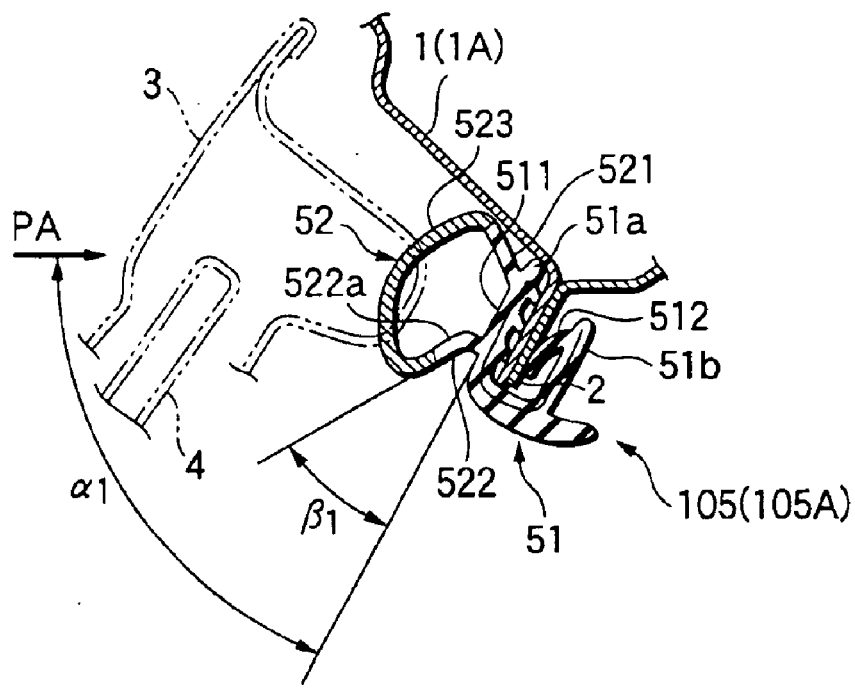
FIGS. 3A, 3B, and 3C illustrate an embodiment of the invention, and are sectional views each illustrating attached states of weather strips attached along line A—A, B—B, and C—C of FIG. 10, respectively.

As shown in FIG. 3A, in the first part 105A of the weather strip 105, which is provided along the roofside portion 1A of the door opening peripheral part 1, the approaching angle $\alpha_1$ of the outer periphery part of the door 3 with respect to the side face 511 of the mounting base part, which is almost parallel to the flange 2, of the door 3 when the door is closed, is nearly 65°. On the other hand, the rising angle $\beta_1$ of the bridge portion 522b of the side-face projection 522 with respect to the side face 511 of the mounting base part is set within a range of 20° to 30°. In this embodiment, the rising angle $\beta_1$ of the bridge portion 522b is set at 25°.

Figure 3B:
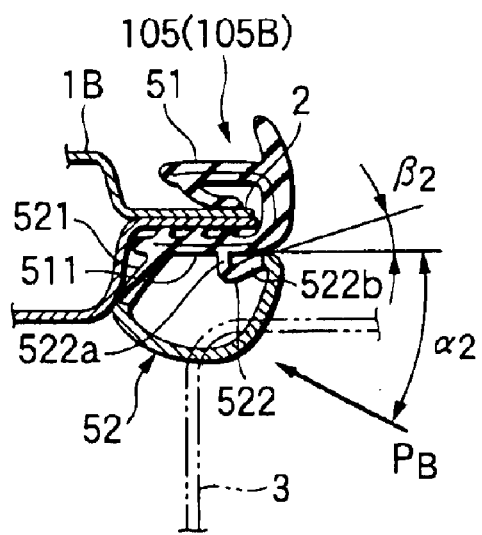

As illustrated in FIG. 3B, at the second part 105B of the weather strip 105, which is provided along the front vertical portion 1B of the door opening peripheral part, the approaching angle $\alpha_2$ of the outer periphery part of the door 3 is approximately 35°. The bridge portion 522b of the side-face projection 522 is tilted in a direction toward the side face 511 rather than a direction parallel to the side face 511 of the mounting base part, that is, in a direction toward the interior of the vehicle (that is, toward a negative side). Thus, the rising angle $\beta_2$ thereof with respect to the side face 511 is set within a range of 0 to −15°. In this embodiment, the rising angle $\beta_2$ thereof at (−15°).

Figure 3C:
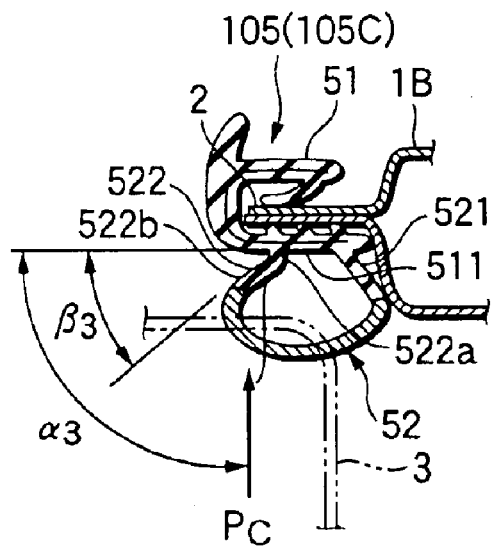

As illustrated in FIG. 3C, at the third part 105C of the weather strip 105, which is provided along the rear vertical portion 1C of the door opening peripheral part 1, the approaching angle $\alpha_3$ of the outer periphery part of the door 3 is approximately 90°. The rising angle $\beta_3$ of the bridge portion 522b of the side-face projection 522 with respect to the side face 511 is set within a range of 30° to 45°. In this embodiment, the rising angle $\beta_3$ thereof is set at 40°.

Incidentally, although not shown in the drawings, the shape of a section of the hollow seal part 52 of the fourth part of the weather strip 105, which is provided at the rocker portion 1D of the door opening peripheral part, is substantially that of a section of the third part 105C of the weather strip 105. The approaching angle $\alpha_4$ of the door 3 with respect to the fourth part attached to the flange erected vertically and upwardly is almost 90°. On the other hand, the rising angle $\beta_4$ of the bridge portion 522b of the side-face projection 522 with respect to the side face of the mounting base part is set at 40°.

In the weather strip 105 in which the rising angle of the bridge portion 522b of the side-face projection 522 of the hollow seal part 52 with respect to the side face 511 of the mounting base part is changed among the parts thereof, the rising angle of the bridge portion 522b corresponding to each of the parts of the weather strip 105 is set to be smaller than the approaching angle of the door when the door is closed. Thus, the side-face projection 522 does not serve as a strut for the door 3 that approaches there, so that a door closing force does not increase.

Further, the difference between the approaching angle of the door 3 at each of the parts of the weather strip and the rising angle of the bridge portion 522b, that is, the spacing angle between the approaching direction of the door 3 and the protruding direction of the bridge 522b ranges 35° to 45° at the first part 105A, and 35° to 50° at the second part 105B, and 45° to 60° at the third part 105C and the fourth part (not shown: corresponding part to 5D) by setting the rising angles $\beta_1$, $\beta_2$, and $\beta_3$, as described above. In this embodiment, the spacing angle is set at 40° at the first part 105A, and at 50° at the second part 105B and the third part 105C. Thus, when the seal wall 523 is pressed inwardly by the door 3, the tip end of the bridge portion 522b does not cause the seal wall 523 to bulge out toward the vehicle interior. Furthermore, the spacing angle is uniformed among the parts of the weather strip. Consequently, the deformation of the seal wall 523 at the time of inwardly pressing the seal wall 523 by the door 3 is uniformed among the parts of the weather strip. Hence, uniform and good sealing performance is obtained over the entire weather strip.

The weather strip 105, in which the rising angle of the bridge portion 522b with respect to the side face 511 of the mounting base part varies with the first to third parts 105A to 105C and the fourth part of thereof, can be manufactured by performing the variable extrusion. In this case, in the boundary part from one of the parts 105A to 105C to another thereof, the shape of a section of the seal part is gradually changed from the shape of a section thereof corresponding to the one of the first to third parts 105A to 105C and the fourth part to the shape of a section of another thereof.

Although the rising angle of the bridge portion 522b varies with the first, second, and third parts 105A, 105B, and 105C and the fourth part of the weather strip in the aforementioned embodiment, the rising angle corresponding to the first part 105A may be common to the parts other than the second part 105B. Consequently, an operation of performing the variable extrusion is facilitated.

Further, the structure of the rocker portion 1D of the door opening peripheral part 1 is sometimes different largely from those of the other parts thereof. In such a case, the form of the bridge portion 522b corresponding to the fourth part (5D) of the weather strip is not limited to that of the bridge portion corresponding to the first part 105A or to the third part 105C.

Figure 11B:
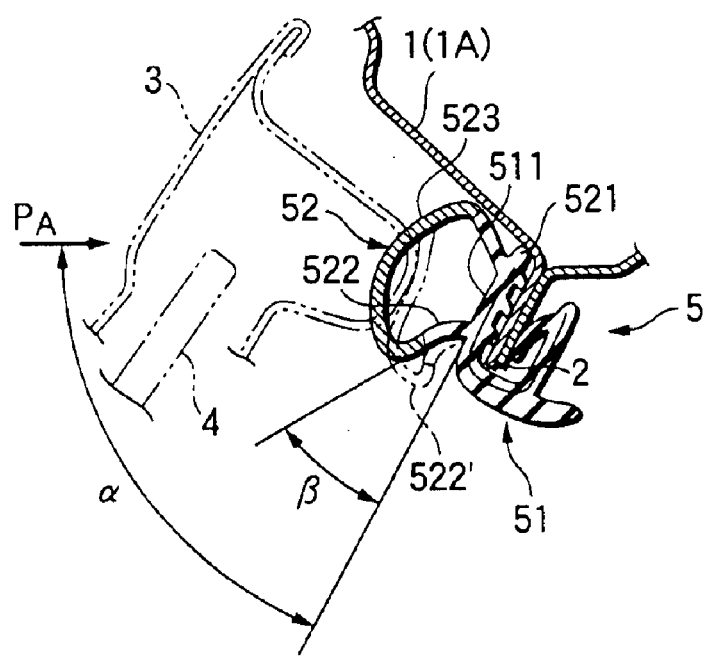
FIGS. 11A and 11B are sectional views showing a conventional weather strip, which is taken along line A—A of FIG. 10.
Figure 11A:
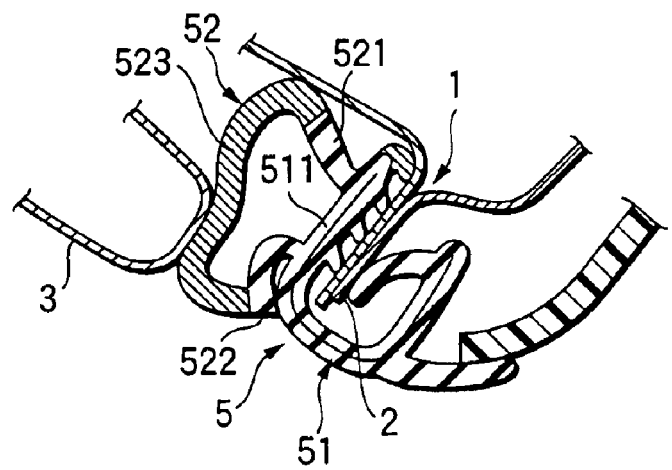
Figure 12A:
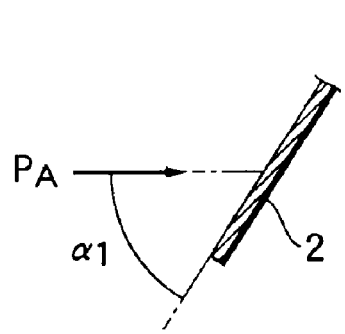
FIGS. 12A, 12B, 12C, and 12D are views each showing the relation between a flange, which is provided at a position along a corresponding one of lines A—A, B—B, C—C, and D—D of FIG. 10, and an approaching direction, in which a door approaches there when the door is closed.
Figure 12B:
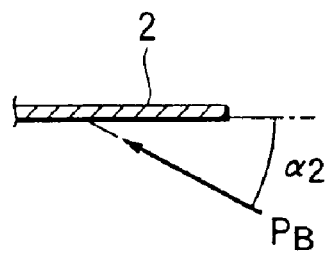
Figure 12C:
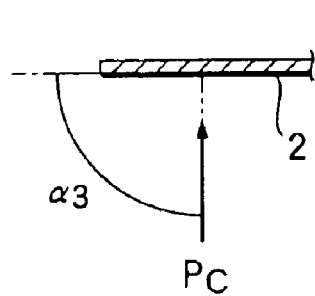
Figure 12D:
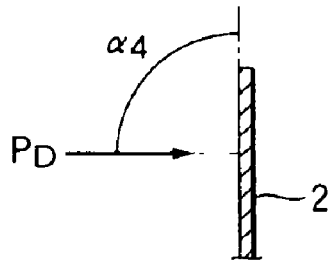
Figure 13:
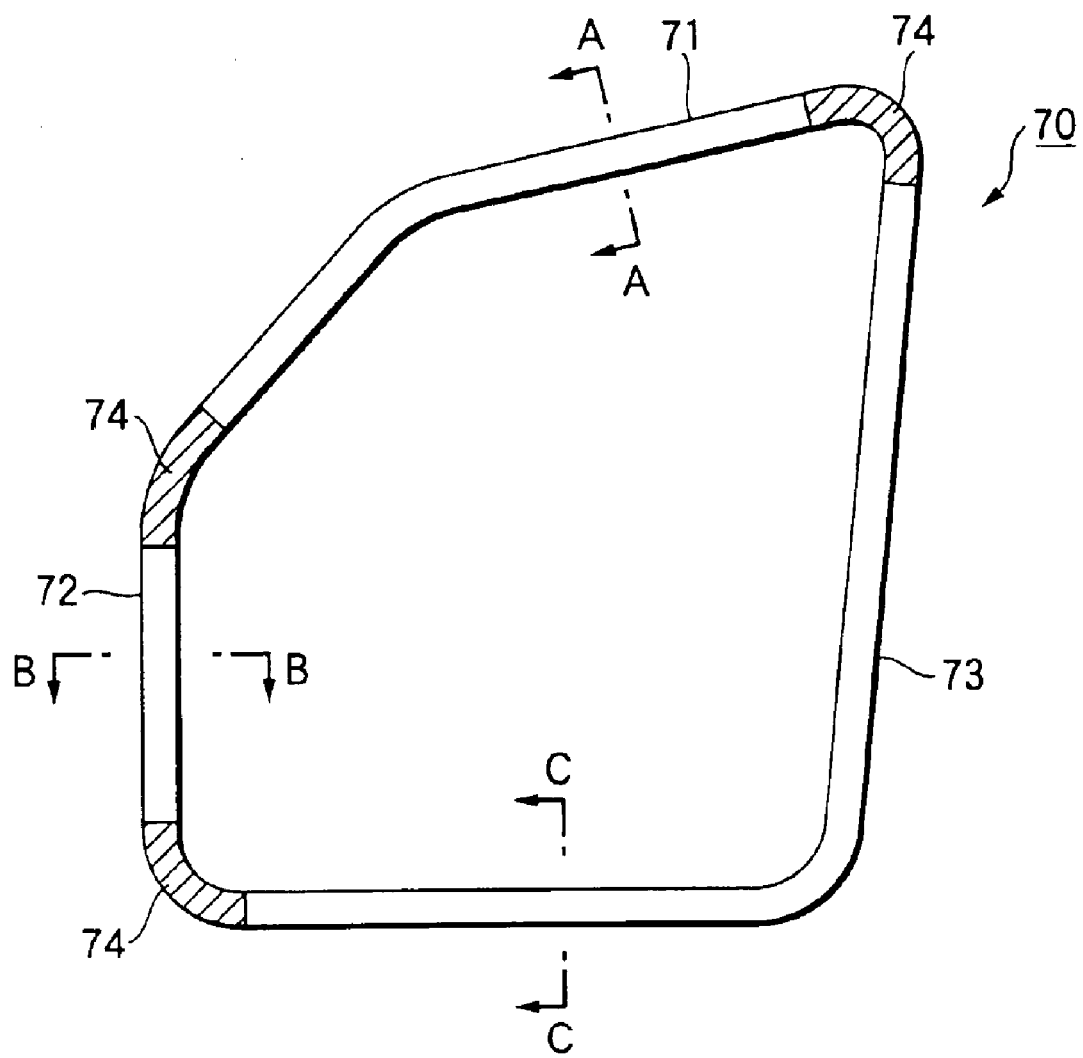
FIG. 13 is a front view illustrating a conventional door weather strip.
Figure 14A:
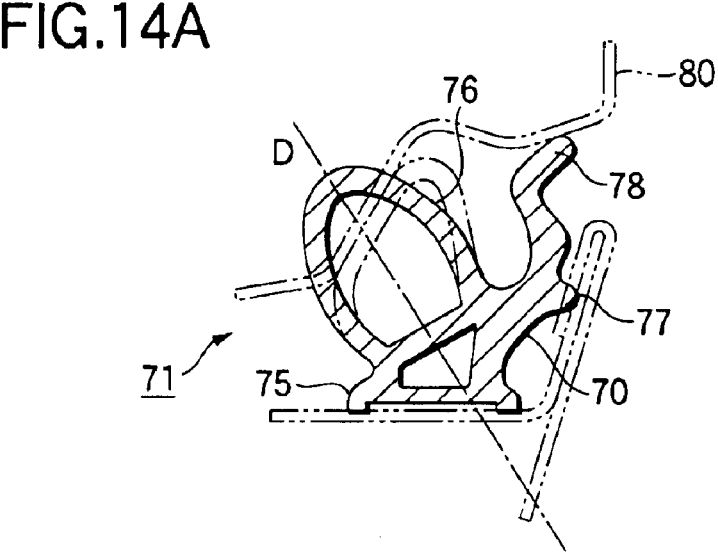
FIG. 14A is a sectional view taken along line A—A of FIG. 13.
Figure 14B:
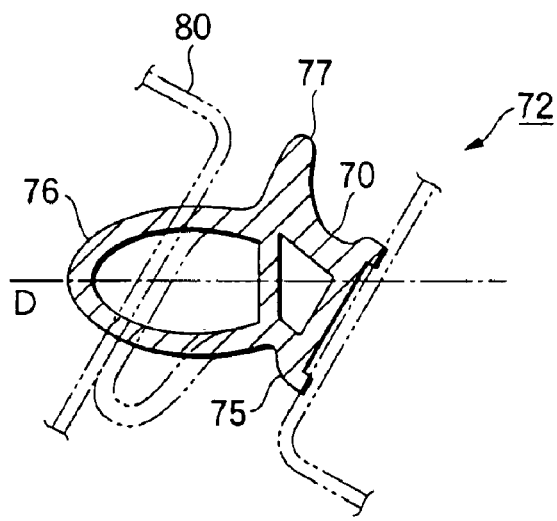
FIG. 14B is a sectional view taken along line B—B of FIG. 13.
Figure 14C:
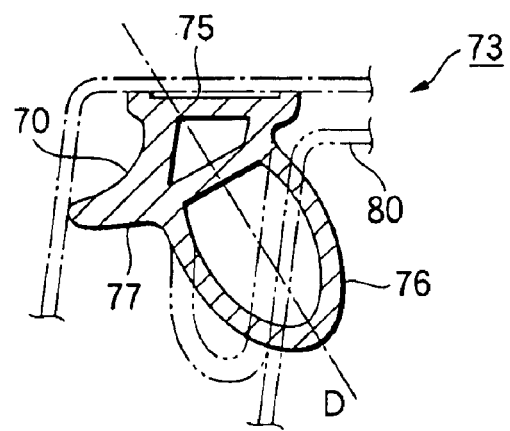
FIG. 14C is a sectional view taken along line C—C of FIG. 13.

Moreover, although the side-face projection 522 is formed like a letter "L" from the base end part 522a and the bridge portion 522b, the invention can be applied to the weather strip in which the side-face projection 522 is formed linearly, as illustrated in FIG. 11B.

Incidentally, it has been described in the foregoing description of the aforementioned embodiment that one of the side faces 511 of the mounting base part 51 is parallel to the flange 2 during the state in which the weather strip is attached along the door opening peripheral part. However, in the case that one of the side faces 511 is attached to the flange 2 at a certain angle therewith, a reference surface for setting the aforementioned angles α and β is an outside surface of the flange 2. Furthermore, although the mounting base part 51 having a U-shaped section has been described by way of example in the foregoing description of the aforementioned embodiment, the mounting base part of the invention is not limited thereto. The mounting base part may be of another shape having a part corresponding to the one of the side faces 511.

Hereinafter, a door weather strip of the invention, which is attached to the outer periphery of the vehicle door, is described with reference to the accompanying drawings. Incidentally, the sealing structure according to this embodiment features especially the shape of a section of an extrusion portion of a weather strip. This sealing structure of the invention is exemplified by a sealing structure that uses a front door weather strip consisting of one molding portion and one extrusion portion and that is described hereinbelow.

Figure 5:
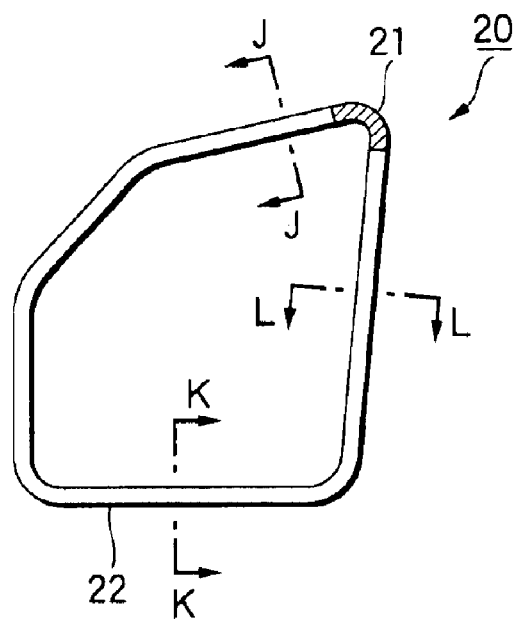
FIG. 5 is a front view illustrating a front door weather strip.
Figure 6:
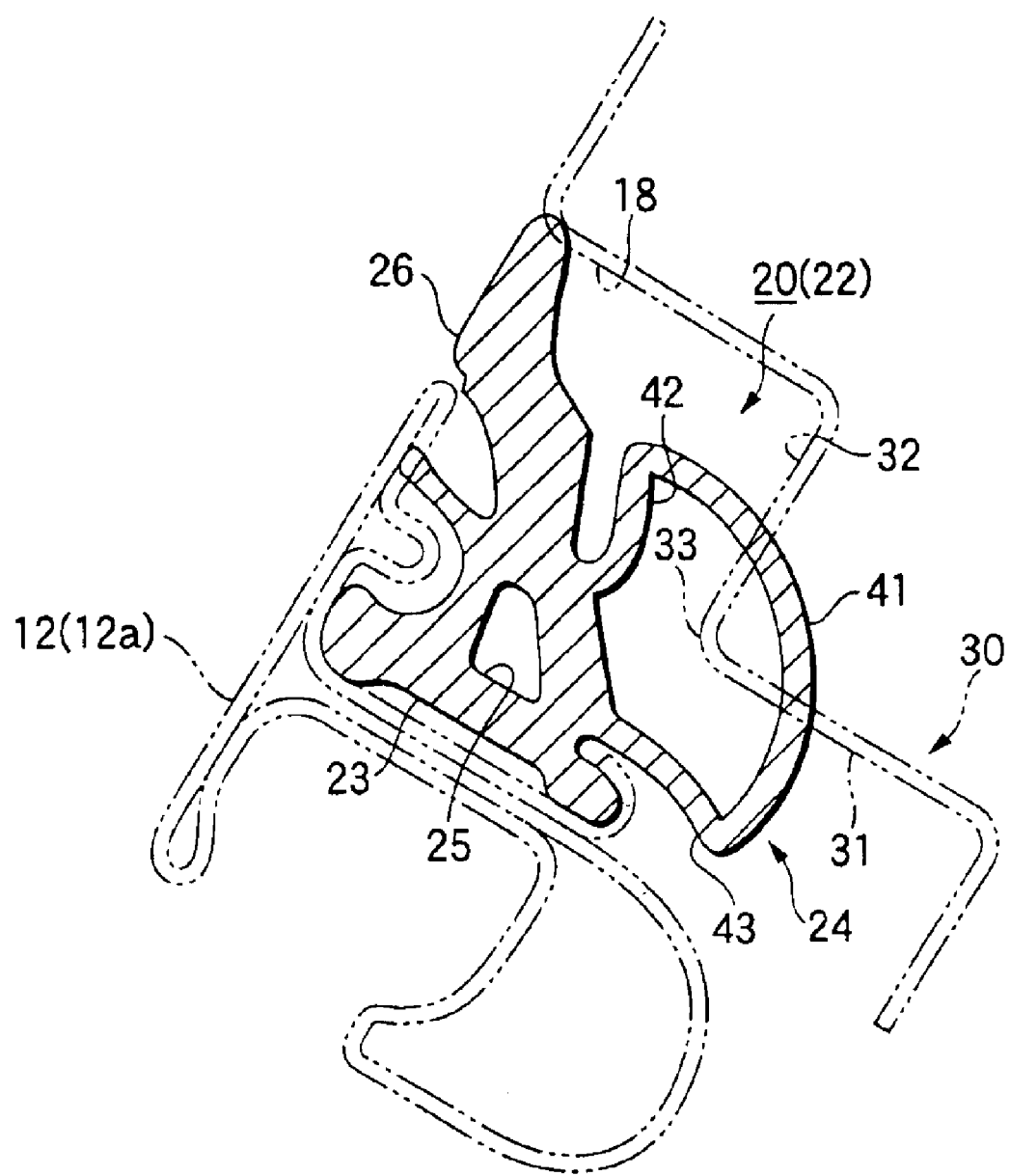
FIG. 6 is a sectional view taken along line J—J of FIG. 5.
Figure 7A:
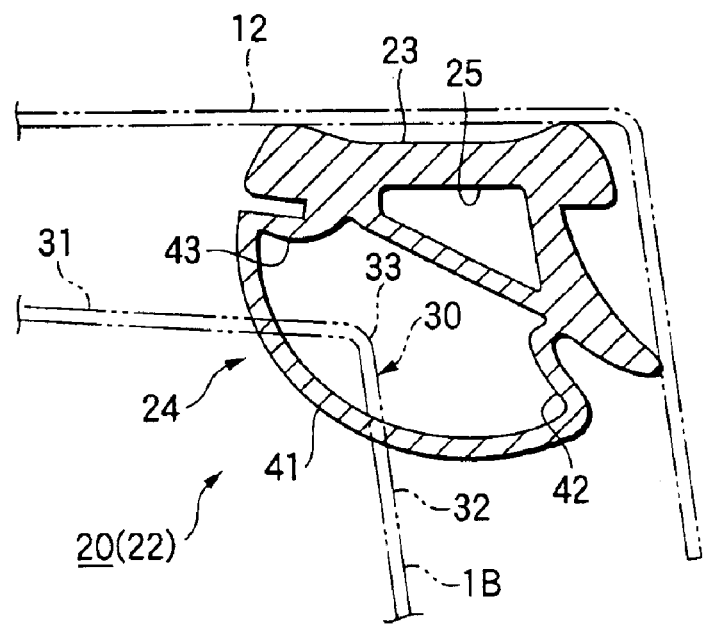
FIG. 7A is a sectional view taken along line K—K of FIG. 5.
Figure 7B:
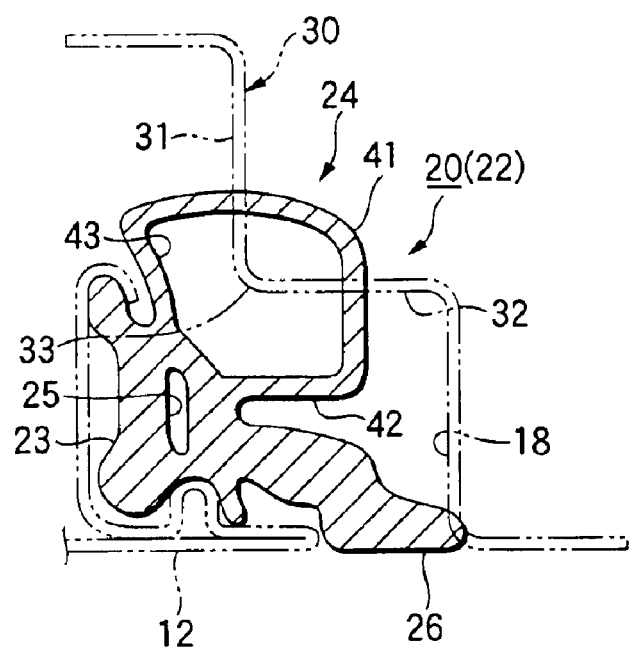
FIG. 7B is a sectional view taken along line L—L of FIG. 5.

FIG. 5 is a front view illustrating the front door weather strip to be attached to a front door. FIG. 6, and FIGS. 7A and 7B are sectional views respectively taken along line J—J, line K—K, and line L—L of FIG. 5.

Figure 4:
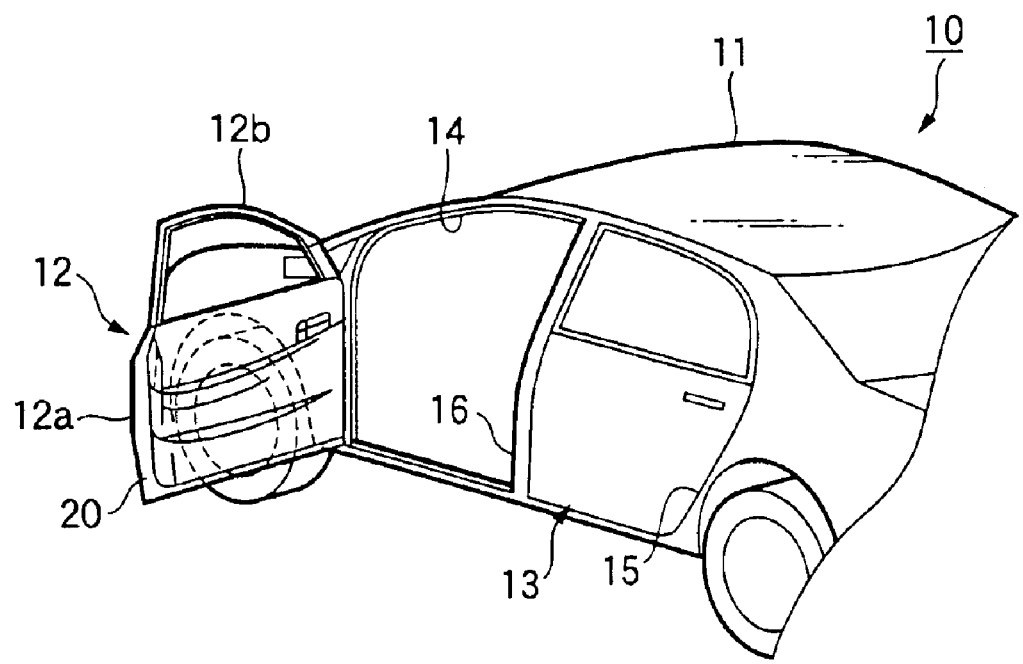
FIG. 4 is a partly perspective view illustrating a vehicle employing a sealing structure that is an embodiment of the invention.

As shown in FIG. 4, in a body 11 of a vehicle 10 employing this sealing structure, a pair of front doors 12 and a pair of rear doors 13 (incidentally, only the left-side ones of the front and rear doors 12 and 13 are shown in this figure) are openably and closably supported on front side parts and rear side parts, respectively. Further, in the vehicle body 11, an opening part 14 for the front door, and an opening part 15 for the rear door are respectively formed at a position, to which each of the front doors 12 corresponds, and another position, to which each of the rear doors 13 corresponds. Between the opening parts 14 and 15 on each of the left-hand and right-hand sides of the vehicle body 11, a center pillar part 16 constituting a part of the opening parts 14 and 15 is formed.

As illustrated in FIGS. 4 and 6, each of the front doors 12 has a door panel 12a and a door sash 12b. Further, a front door weather strip (hereunder referred to simply as "a weather strip") 20 serving as the weather strip is attached along a peripheral part of each of the front doors 12 through double-sided adhesive tape (not shown) and a clip (not shown). Further, when the state of the front door 12 is changed from an opened state (that is, the state illustrated in FIG. 4) to a closed state to thereby shut up a corresponding one of the front door openings 14, a hollow seal part 24 (to be described later) of the door weather strip 20 is in elastic contact with opening edge part 18 of the front door opening 14. Thus, during a state in which the front door 12 is closed, the inside and the outside of the front door 12 are sealed.

Further, the weather strip 20 is formed from an elastic material, for example, an EPDM rubber. Furthermore, as shown in FIG. 5, this weather strip 20 is formed like a loop, as a whole, and comprises a molding portion 21, which is formed substantially like a letter "L" by a molding method, and the rest part, which is an extrusion portion 22 continuously formed by performing a variable extrusion method using variable mouthpieces. Incidentally, the molding portion 21 is formed so as to correspond to a rearward upper portion of the door sash part 12b, that is, a corner portion of an upper part at the side of the center pillar part 16.

As illustrated in FIGS. 6, 7A and 7B, basically, the extrusion portion 22 has a mounting base part 23, which is attached along the peripheral portion of the front door 12, and a hollow seal part 24 formed on the mounting base part 23 so as to be integral therewith. Further, although not shown, similarly, the molding portion 21 has a mounting base part and a seal part formed in such a manner as to be continued to the mounting base part 23 and the seal part 24 of the extrusion portion 22. That is, this weather strip 20 has the base part and the seal part as basic constituent elements, and is formed so as to have a section of a shape so that the weather strip 20 has substantially the same mounting base parts 23 and almost the same seal parts 24 over the full-perimeter thereof.

In the extrusion portion 22 of the weather strip 20, a hollow lightening portion 25 is formed in the mounting base part 23 thereof. Further, a seal lip 26 is formed on the mounting base part 23 so as to project therefrom so as to close a gap between the front door 12 and the vehicle body 11. Incidentally, the seal lip 26 is formed so that the length thereof (that is, an amount of projection thereof) gradually varies with the parts of the weather strip.

In this embodiment, a protruding portion 30 is formed so as to extend along an edge portion of the opening edge part 18. This protruding portion 30 has a first face 31, a second face 32, and an apex part 33 at which both the faces 31 and 32 are orthogonal to each other, and is integrally formed from a panel of the vehicle body 11.

On the other hand, during a closed state of the front door 12, the seal part 24 faces the protruding portion 30. The seal part 24 has a seal wall 41 bulging out so as to face the protruding portion 30 in a curved manner, and also has a pair of side-face projections 42 and 43 for connecting both ends in the direction of width of the seal wall 41 to the mounting base part 23. The distance between the pair of side-face projections 42 and 43 increases in a direction toward the seal wall 41 from the mounting base part 23. In other words, a section of the seal part 24 is shaped substantially like a sector. In this embodiment, the pair of side-face projections are formed so that one of the side-face projections 42 extends substantially in parallel with the first face 31 of the protruding portion 30, and that the other side-face projection 43 extends substantially in parallel with the second face 32 thereof. Additionally, the side-face projections are formed so that the length of each of the side-face projections 42 and 43 (or the distance between the mounting base part 23 and each of both the ends of the seal wall 41) is larger than the thickness of the seal wall 41.

Further, the seal part is configured so that during a state in which the front door 12 is closed, the apex part 33 of the protruding portion 30 is placed substantially at the center of the seal wall 41, and that the connection part between the seal wall 41 and each of the side-face projections 42 and 43 is always in no contact with the opening edge part 18 (including the protruding portion 30).

Next, the procedure for manufacturing the weather strip 20 is briefly described hereinbelow. Incidentally, in the drawings, an apparatus to be used for manufacturing the weather strip 20 is omitted.

First, an elastic material having a section of a shape, which is the same as the shape of a section of the extrusion portion 22, is extruded from a mold, which has a predetermined opening part, by using an extrusion machine. At that time, various shapes of a section having the aforementioned feature are imparted from a variable extrusion mechanism to the extrusion portion 22. Thereafter, the molding portion 21 is formed by using a mold apparatus so as to connect both end portions of the extrusion portion 22. Thus, the weather strip 20 of the aforementioned configuration is obtained.

Next, operations and effects of this embodiment are described hereinbelow.

In the case of this embodiment, apart of the weather strip, which corresponds to the corner portion of the center-pillar-part-side upper part, is constituted by a molding portion 21, and the rest of the weather strip is constituted by the extrusion portion 22. Thus, the size of a region of the molding portion 21, in which the thickness of the seal part is liable to be relatively large, can be reduced. Consequently, the resistance to a movement of closing the front door 12 can be decreased, as a whole.

Figure 8:
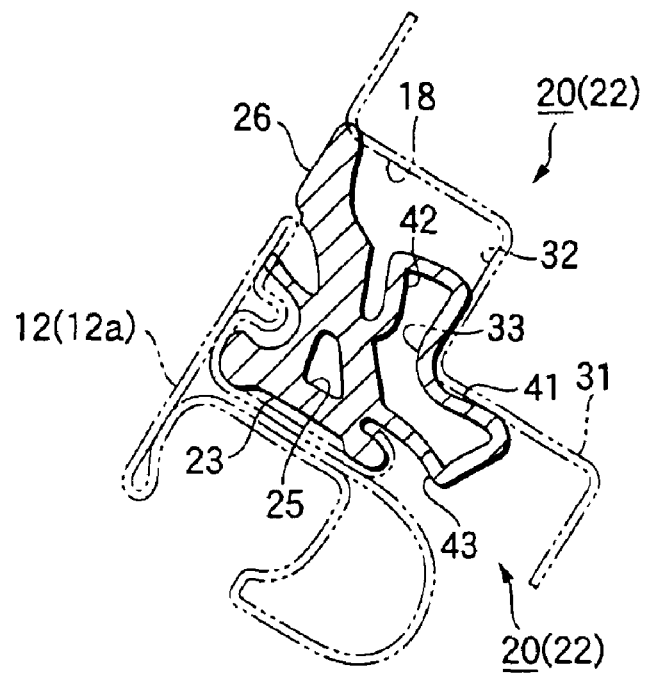
FIG. 8 is a sectional view illustrating an operation at the time of closing the door.

Further, the seal part 24 of the invention has the seal wall 41 bulging out so as to face the protruding portion 30 in a curved manner, and also has the pair of side-face projections 42 and 43 for connecting both ends in the direction of width of the seal wall 41 to the mounting base part 23. Furthermore, as illustrated in FIG. 8, during a closed state of the front door 12, the apex part 33 of the protruding portion 30 is placed substantially at the center of the seal wall 41. Moreover, the connection part between the seal wall 41 and each of the side-face projections 42 and 43 is always in no contact with the opening edge part 18 (or the protruding portion 30). Therefore, the side-face projections 42 and 43 are not deformed very much. It is mainly the seal wall 41 that is elastically deformed so as to follow the shape of the tip end of the protruding portion 30. Moreover, it is difficult to deform the entire seal part 41 and to deform the seal part by being inclined only in a limited direction. Thus, it is hard to cause a slide friction force between the seal portion and the opening edge portion. Consequently, the door closing force at the time of closing the door can be suppressed. Moreover, the feeling at that time can be improved.

Furthermore, the distance between the pair of side-face projections 42 and 43 increases in a direction toward the seal wall 41. In other words, the section of the seal portion is shaped substantially like a sector. Moreover, the side-face projections 42 and 43 extend substantially in parallel with the first face 31 and the second face 32 of the protruding portion 30, respectively. Thus, the side-face projections 42 and 43 become more difficult to bend. That is, the deformation of the seal wall 41, whose part corresponding to the protruding portion 30 bulges out in a curved manner so as to face the protruding portion 30, can be more reliably and preferentially performed. Consequently, the aforementioned operations and effects can be reliably obtained.

Additionally, the length of each of the side-face projections 42 and 43 is larger than the thickness of the seal wall 41. This facilitates the preferential implementation of elastic deformation of the seal wall 41. Moreover, a sufficient amount of deformation of the seal wall 41 can be assured. Thus, even when variation in the degree of projection of the protruding portion 30 occurs, variation in the door closing force is hard to occur.

The invention is not limited to the embodiment described in the foregoing description and may be practiced, for example, in the following manners.

(a) Although the constitution, in which the inside and the outside of a vehicle are sealed by using the front weather strip 20 provided between the vehicle body and the front door, is embodied into the aforementioned embodiment, the invention can be applied to the case that the inside and the outside of the vehicle are sealed by using a rear door weather strip provided therebetween.

Figure 9:
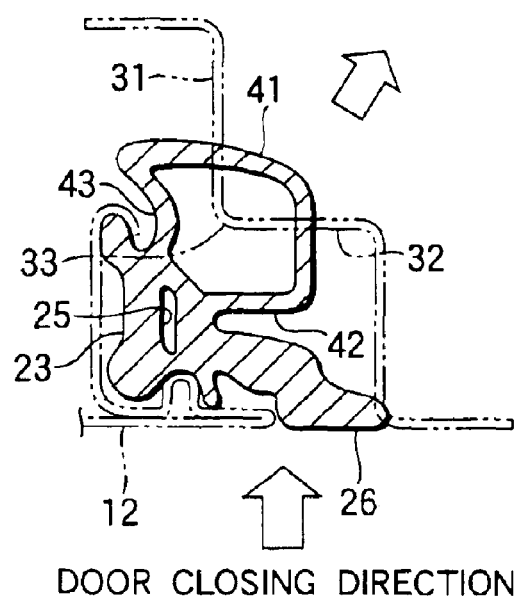
FIG. 9 is a sectional view illustrating a weather strip that is another embodiment of the invention.
Figure 10:
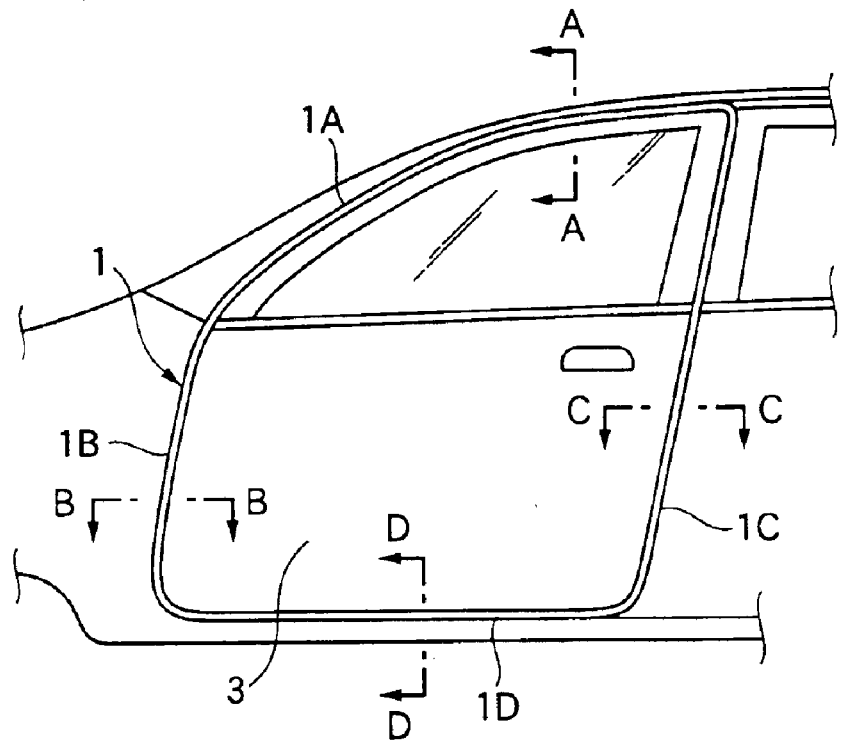
FIG. 10 is a front view showing a door opening of a vehicle body to which a weather strip according to the invention is applied.

(b) Although no particular reference is made in the foregoing description of the embodiment, a direction, in which the door is closed, is sometimes different from a direction, in which the seal part faces the protruding portion. For example, as illustrated in FIG. 9, in the case that the door is closed in a direction indicated by an arrow shown in this figure (that is, an upward direction, as viewed in this figure), the direction, in which the seal part 24 faces the protruding portion 30, is a rightwardly upward direction, as viewed in this figure. In such a case, it is possible that stresses applied from the seal wall 41 to the side-face projections 42 and 43 differ from each other. In this case, as illustrated in this figure, the stiffness of the side-face projection 43, to which a higher stress is applied, (that is, the side-face projection 43 to which a stress is applied in a direction substantially parallel to the direction in which the door is closed) may be increased by forming the side-face projection 43 into a curved shape so as to be higher than the stiffness of the other side-face projection 42. Alternatively, the stiffness of the side-face projection 43, to which a higher stress is applied, may be increased by forming the seal wall 41 provided in the vicinity of the side-face projection 43 so as to be thicker than the seal wall 41 provided in proximity of the other side-face projection 42. Thus, occurrences of defects due to excessive deformation of the side-face projection 43, to which a higher stress is applied, and the seal wall provided in the vicinity thereof can be restrained.

(c) Although EPDM has been described as an example of the material of the weather strip 20, other rubber materials, such as IR (isoprene rubber) and CR (chloroprene rubber), may be used instead of EPDM. Alternatively, the weather strip may be made of other elastic materials having rubber-like elasticity, such as an olefinic thermoplastic elastomer (TPO) or plasticized polyvinyl chloride.

(d) The protruding portion 30 may be provided along only a part of the opening edge part 18. Alternatively, the protruding portion 30 may be provided along all or almost all of the opening edge part 18. In the latter case, the closing force at the time of closing the door can be uniformed. The feeling at that time can be improved still more.

(e) Although the weather strip 20 is embodied in the aforementioned embodiment so as to comprise one molding portion 21, which is formed substantially like a letter "L", and the remaining part that is an extrusion portion 22, the weather strip may comprise a plurality of extrusion portions and a plurality of molding portions. In short, it is sufficient that at least a part of the seal portion (especially, the extrusion portion), which corresponds to the protruding portion) comprises a seal wall and a pair of side-face projections, as described above.

(f) Although no particular reference is made in the foregoing description of the embodiment, the extrusion portion may be formed so that the shape of a section of an end portion thereof is the same as or substantially the same as the shape of a section of the other end portion thereof. With such a configuration, the structure of the mold used at the forming of the molding portion can be prevented from being complicated. Further, regarding the extrusion forming, in the case that the a part corresponding to the right-side door and a part corresponding to the left-side door are continuously formed, and that an amount of an extruded material changes in a longitudinal direction (that is, the case of the variable extrusion method), there is almost no change in the amount of the extruded material at the boundary part between the part corresponding to the right-side door and the part corresponding to the left-side door. Thus, accurate extrusion forming can relatively easily be performed.

According to the weather strip of the invention, a direction, in which a door is pressed against a seal wall of a hollow seal part of the weather strip, can be made to be perpendicular to the seal wall despite of the fact that a direction, in which the flange protrudes, varies with parts of a door opening peripheral part. Thus, the weather strip according to the invention effectively brings out uniform and good seal performance. Moreover, the weather strip of the invention can be manufactured with good productivity by a variable extrusion method according to which the shape of the section thereof is partly changed.

Even in the case that the approaching direction, in which the door approaches the weather strip continuously attached along the door opening peripheral part of the vehicle body side, varies largely with the parts of the weather strip, the seal walls of the parts thereof are uniformly deformed by pressing the door thereagainst. Moreover, an occurrence of an adverse bulge is prevented. Thus, uniform and good sealing performance is exerted over the entire weather strip.

What is claimed is:

1. A weather strip, which is attachable to a support member and which opposes an opposing member, wherein the support member is one of a peripheral part of a door and a door opening part of a vehicle body, and the opposing member is the other of the peripheral part of the door and the door opening part of the vehicle body, and wherein the weather strip is for sealing between said vehicle body and said door, said weather strip is an opening trim weather strip attached to a flange formed on the peripheral part of said door opening part, and wherein said weather strip comprises:
    a mounting base part, which is attachable to the support member; and
    a hollow seal part, which is adapted to bulge from said mounting base part toward the opposing member, said hollow seal part including:
        an inner side-face projection and an outer side-face projection, which protrude from said mounting base part such that the distance between the inner side-face projection and the outer side-face projection increases toward distal ends thereof; and
        a seal wall connecting the distal ends of said inner and outer side-face projections in a convex manner, wherein:
            said seal wall is adapted to press against a protruding portion of said opposing member when the door is closed;
            projecting widths and projecting angles of said outer and inner side-face projections vary in a longitudinal direction of said weather strip so that said seal wall is disposed substantially perpendicular to a pressing direction of said opposing member;
    a first part which is attached to a roofside portion of said peripheral part of said door opening part;
    a second part attached to a first vertical portion of said peripheral part to which said door is hinge-connected, wherein:
        a projecting width of said outer side-face projection in said second part is substantially equal to a projecting width of said outer side-face projection in said first part, and
        a projecting width of said inner side-face projection in said second part is smaller than a projecting width of said inner side-face projection in said first part; and
    a third part attached to a second vertical portion of said peripheral part of said door opening part which is located on an opposite side to said first vertical portion with respect to the door opening, wherein:
        a projecting width of said inner side-face projection of said third part is substantially equal to a projecting width of said inner side-face projection of said first part;
        a projecting width of said outer side-face projection in said third part is smaller than a projecting width of said outer side-face projection in said first part; and
        a tangential direction of said seal wall in each of said first, second and third parts is set to be substantially perpendicular to the pressing direction of said door in a state in which said weather strip is attached.

2. A weather strip according to claim 1, wherein a sectional shape of said hollow seal part in a fourth part of said weather strip attached to a rocker portion in a lower portion of said door opening part is substantially the same as the sectional shape of said hollow seal part in said second part.

3. A weather strip according to claim 1, wherein the weather strip is formed by extrusion, and boundary parts between said first part and said second part as well as between said first part and said third part are formed so as to have sectional shape gradually changed from the one to the other mating sectional shape.

4. A combination of a door opening part of a vehicle body and a weather strip, which is adapted to be attached to a peripheral part of a door, wherein the weather strip is for sealing between said door opening part, and wherein said weather strip comprises:
    a mounting base part, which is adapted to be attached to the peripheral part of the door; and
    a hollow seal part, which bulges from said mounting base part toward the door opening part, said hollow seal part including:
        an inner side-face projection and an outer side-face projection, which protrude from said mounting base part such that the distance between the inner side-face projection and the outer side-face projection increases toward distal ends thereof; and
        a seal wall connecting the distal ends of said inner and outer side-face projections such that the seal wall is convex, wherein:
            said seal wall is adapted to press against a protruding portion of said door opening part when the door is closed, wherein the protruding portion has a first face and a second face, and one of the inner and outer side-face projections of the weather strip is formed to extend substantially parallel to the first face, and the other of the side-face projections is formed to extend substantially parallel to the second face when the door is closed;

projecting widths and projecting angles of said outer and inner side-face projections vary in a longitudinal direction of said weather strip so that said seal wall is disposed substantially perpendicular to a pressing direction of said protruding portion; and a pair of connection parts located between said seal wall and said inner and outer side-face projections, respectively, wherein the connection parts are configured such that neither connection part contacts said door opening part when the door is closed.

5. A combination of a door opening part of a vehicle body and a weather strip according to claim 4, wherein a distance between said inner and outer side-face projections increases toward a seal wall side from an attachment base part side.

6. A combination of a door opening part of a vehicle body and a weather strip according to claim 4, wherein a length of each of said side-face projections is larger than a thickness of said seal wall.

7. A weather strip, which is attachable to a support member and which opposes an opposing member, wherein the support member is one of a peripheral part of a door and a door opening part of a vehicle body, and the opposing member is the other of the peripheral part of the door and the door opening part of the vehicle body, wherein the weather strip is for sealing between said vehicle body and said door, said weather strip is an opening trim weather strip attached to a flange formed on the peripheral part of said door opening part, and wherein said weather strip comprises:

a mounting base part, which is attachable to the support member;

a hollow seal part, which is adapted to bulge from said mounting base part toward the opposing member, said hollow seal part including:

an inner side-face projection and an outer side-face projection, which protrude from said mounting base part such that the distance between the inner side-face projection and the outer side-face projection increases toward distal ends thereof; and a seal wall connecting the distal ends of said inner and outer side-face projections in a convex manner, wherein:

said seal wall is adapted to press against a protruding portion of said opposing member when the door is closed; and projecting widths and projecting angles of said outer and inner side-face projections vary in a longitudinal direction of said weather strip so that said seal wall is disposed substantially perpendicular to a pressing direction of said opposing member;

a first part which is attached to a roofside portion of said peripheral part of said door opening part;

a second part attached to a first vertical portion of said peripheral part to which said door hinge-connected; and a third part attached to a second vertical portion of said peripheral part of said door opening part which is located on an opposite side to said first vertical portion, wherein rising angles of said inner side-face projection with respect to a side face of said mounting base portion are set to be $\beta_3 \geq \beta_1 > \beta_2$, where $\beta_2$ is the rising angle in said first part, $\beta_1$ is the rising angle in said second part, and $\beta_3$ is the rising angle in said third part.

8. A weather strip according to claim 7, wherein said inner and outer side-face projections are formed from a solid material or a minutely foamed material, which is higher in stiffness than a sponge material forming said seal wall.

9. A weather strip according to claim 7, wherein at least one of said inner and outer side-face projections is formed into an L-shape.

10. A weather strip according to claim 7, wherein said rising angles of said inner side-face projection of said hollow seal part are set so that $20° \leq \beta_1 \leq 30°$, $0 \leq \beta_2 \leq -15°$, and $30° \leq \beta_1 \leq 45°$ where it is assumed that an angle corresponding to a direction parallel to said side face of said mounting base part is set to be 0°, that angles corresponding to a direction toward an external side of a vehicle are positive angles, and that angles corresponding to a direction toward an inner side of said vehicle are negative angles.

11. A weather strip according to claim 7, wherein the weather strip is formed by extrusion, wherein each of boundary parts among the first, second and third parts is formed so as to have sectional shape to be gradually changed from the one to the other mating sectional shape.

* * * * *